Patented July 2, 1935

2,006,942

UNITED STATES PATENT OFFICE 2,006,942

METHOD OF MAKING ALIPHATIC ALCOHOLS

Lee H. Clark, Grosse Ile, Mich., and Frank J. Worster, Belle, W. Va., assignors to The Sharples Solvents Corporation, Philadelphia, Pa., a corporation of Delaware No Drawing. Application March 2, 1933, Serial No. 659,346

10 Claims. (Cl. 260—156)

The present invention relates to a process of producing alcohols by the hydration of olefins.

It has long been known that alcohols can be produced by the successive treatment of olefins with sulphuric or phosphoric acid and water under properly controlled conditions. In the actual attempt to practice such a process on a commercial scale, however, numerous difficulties are encountered, and the present invention has as an object the elimination of these difficulties and the development of a process by which high yields of alcohols may be obtained and in which economies of operation are effected by careful manipulation designed to prevent the formation of undesired by-products.

A further object of the invention has been the development of a method of operation by which a mixture of olefins can be treated to produce separately formed mixtures of alcohols in which the individual constituents of a given mixture are related with respect to chemical structure and other characteristics. Such a method possesses important advantages over previously proposed methods involving the hydration of mixtures which consist of a larger number of olefin compounds in a single operation. The capacity of sulphuric acid of a given concentration to absorb various olefins differs widely with the nature of the particular olefin under treatment. Furthermore, the tendency of olefins to polymerize and the tendency of the formed alcohols to be reconverted into olefins under given conditions of heat and acid concentration differ widely with the particular olefin under treatment. Thus, a concentration of acid which is adapted to absorb a given part of an olefin mixture may well act to cause undesirable polymerization of another part, and even in the case of the conversion of different olefins to alcohols, a portion of the alcohol may be decomposed by contact with the acid in the hydrated mixture.

The separation of olefins having varying characteristics and structure and the hydration of these olefins in separate batches, each consisting of a mixture of olefins having related characteristics, is therefore important both from the standpoint of economy of operation in the production of the alcohols and because of the elimination of the necessity for the performance of difficult fractionation of the finished products to separate alcohols formed into desired groups.

The exact nature of the phenomena which occur when olefins are treated with sulphuric acid of a strength adapted to effect their absorption is not fully understood and it appears that these phenomena are different in the treatment of iso-olefins from those involved in the treatment of normal olefins. There is strong evidence to indicate that the absorption of the iso-olefins does not involve a chemical reaction and that the function of the acid in converting these olefins into alcohols is therefore for the most part catalytic. The treatment of normal olefins, on the other hand, apparently involves a chemical addition reaction in which the olefins are first converted into alkyl hydrogen sulphates, and the hydration in this case appears to involve a substitution of the hydroxyl radical for the sulphate radicals of these compounds. In either case, the treatment with acid may be designated as an acid absorption step, and it is to be understood that further reference to acid absorption is intended to include either or both of the above-mentioned phenomena.

Normal and iso-olefins of a given isomeric group react very differently in the presence of absorbing acid of a given concentration. Acid which is sufficiently concentrated to effect an adequate absorption of normal olefins in an isomeric mixture will cause a wasteful polymerization of the iso-olefins of the mixture and an undesirable evolution of heat which tends to induce a decomposition of the product formed and a loss of hydrocarbon due to volatilization. Even where absorption and subsequent hydration of the iso-olefins occur in the treatment of such a mixture, the alcohols formed have a tendency to decompose under the vigorous hydration treatment necessary for the production of alcohols from the normal olefins. On the other hand, the use of acid of a sufficient degree of dilution to avoid these deleterious effects upon the iso-olefins does not afford an adequate absorption of the normal olefins and the maintanance of sufficiently mild hydrating conditions to avoid decomposition of alcohols formed from the iso-olefins is inconsistent with the adequate hydration of the normal olefins. It is therefore a specific object of the invention to effect a substantially complete absorption of the iso-olefins of an isomeric mixture from that mixture prior to the treatment of the mixture with a separate batch of acid of a concentration adapted to absorb the normal olefins of that mixture and to effect the separate hydration of the absorbed mixtures to produce separate batches of alcohols.

Further novel features of the invention pertain to the use of water containing alcohols formed in the reaction in the performance of hydration and washing steps and the recycling of olefins formed by the decomposition of alcohols formed in the process in the performance of subsequent absorption steps. The use of such alcoholic water operates in accordance with well-known principles of chemical equilibrium to prevent the absorption in the wash water of large additional amounts of alcohol and the absorption treatment of the olefins formed by the decomposition of alcohols operates in the interest of efficiency by affording a maximum yield of alcohol from available olefin containing material and a maximum absorption of olefins in a given batch of acid.

Other novel features and advantages of the invention will be obvious from the following detailed description of the process.

Tertiary alcohol process

In the practice of the invention, a mass of mixed olefins including the olefins which it is desired to hydrate, is first segregated. In accordance with the preferred method of operation, this mass should be substantially free of olefins which can be more readily absorbed in the treating acid, or which have a greater tendency to react in the presence of the acid, than the most reactive olefin which it is desired to hydrate. Thus, in the treatment of pentenes, the presence of large amounts of hexenes or higher derivatives is preferably to be avoided. We prefer to treat a body of hydrocarbon consisting of isomeric olefins uncontaminated with large amounts of other olefins and preferably contaminated with as little hydrocarbon other than olefin as is consistent with economical preparation of the mixture to be hydrated. The olefins to be treated may be obtained by a process of fractional distillation from a larger body of hydrocarbon or they may exist as by-products from the manufacture of alcohols or other substances.

Starting with such an isomeric mixture containing both iso- and normal olefins, the mixture is first treated with acid of a concentration adapted to absorb the iso-olefins to the exclusion of the normal olefins present. The absorption process is preferably conducted in a series of counter-current batch treatments. At the conclusion of the last counter-current treatment of a given batch of acid with such an olefin mixture, we prefer to treat a mass of substantially pure iso-olefins with the acid already containing a large amount of absorbed iso-olefins from the previous counter-current steps. This relatively pure iso-olefin mixture may be obtained from any desired source, but we prefer to utilize iso-olefin formed as a by-product in the practice of the process in connection with the further treatment of the acid liquor produced by the preceding absorption steps.

The mixture of acid and olefins is removed to a settling tank between each counter-current treatment in order to allow the acid liquor to settle from unabsorbed olefins. The acid liquor is thereafter mixed with fresher olefins from storage or a preceding step in the absorption process, while the unabsorbed olefin mixture is stored for treatment with acid in the next batch operation.

When the counter-current step-wise treatment has been repeated a sufficient number of times to effect the absorption of substantially all of the iso-olefin in a given olefin mixture from that mixture, the remaining olefin material is stored for subsequent treatment with acid of a higher concentration as will hereinafter appear. The acid is thereafter treated with an olefin mixture of a higher iso-olefin content than the principal batch of olefin under treatment. At the conclusion of this last absorption step, the mixture is again settled and the acid liquor is ready for the hydration treatment.

In this hydration treatment an excess of water is first passed to a mixing tank and the acid liquor is then gradually added to the water, agitation and cooling being maintained during the addition of the acid liquor. In this connection, it is important that the acid liquor be added to the water, as addition of water to acid liquor would involve a contact of small amounts of freshly formed alcohols with large amounts of such liquor containing acid and would result in an undue heating and undesired decomposition of the alcohols by reason of the heat and high concentration of the acid. It is also important that the mixing tank in which the hydration occurs be adequately cooled during this operation in order to avoid such decomposition.

The mixture resulting from the hydrating operation is next subjected to a settling operation in order to remove the alcohol formed from the dilute acid with which it is contaminated, the alcoholic layer being later removed to a neutralizing tank while the acid layer is distilled in a manner which will be subsequenty explained.

The alcohol containing layer is next subjected to one or more washing operations in order to remove further acid contaminations. An important feature in connection with both the hydration step and these water-washing steps consists in the fact that water containing alcohols formed in the reaction is used in the practice of these steps. The use of such alcoholic water possesses important advantages, for the wash water which already contains alcohols is obviously incapable of dissolving an undesirably large portion of the alcohols formed in the hydration step or which might otherwise be dissolved in the water-washing steps.

At the conclusion of the washing operations, the alcoholic layer is passed to a neutralizing tank in which it is treated with alkali in order to neutralize its remaining acid. The neutralized oil is then distilled with sparger steam to remove the alcohol from the products of neutralization, this operation being performed before separation of the neutralizing solution. The first fraction which passes off in this distillation consists of hydrocarbons which have either been unconverted to alcohols or have been decomposed subsequent to their conversion, and consists almost solely of iso-olefins. These hydrocarbons are collected separately from the alcohols and are stored for use in the last absorption step in the treatment of succeeding batches of acids in accordance with the method described above. The alcoholic distillate, which consists of a constant boiling mixture of alcohol and water, is collected and allowed to settle into an alcohol layer containing a small proportion of dissolved water and a water layer containing a small proportion of dissolved alcohol. The water layer is continuously returned to the still to maintain a sufficient body of water therein to continuously carry off the alcohol in the form of a constant boiling mixture. This water returning step has an additional advantage by reason of the fact that it prevents a high concentration of alkali in the still. Such high concentration might otherwise cause decomposition of the alcohols during the later stages of the distillation.

The alcoholic layer resulting from the distillation described above is distilled to free it of water, the water collected from such distillation being passed to a storage tank for subsequent use in the hydration and washing of later batches. This water contains a small amount of alcohol, and its use in this connection constitutes an important feature of the invention.

The dilute acid resulting from the hydrating step is distilled. While this acid contains alcohol, its distillation causes a decompositon of a part of this alcohol into water and olefins, and olefins contaminated with a small amount of alcohol pass off in the distillation operation and are collected. The olefin-alcohol mixture so obtained contains an iso-olefin mixture substantially uncontaminated with normal olefin and is stored together with the olefins obtained in the fractional distillation of the neutralized alcoholic mixture, this substantially pure iso-olefin mixture being utilized in the last absorption step with respect to subsequent batches of acid, as above explained. The dilute acid remaining after the removal of this olefin by distillation may be concentrated or used in any desired manner. The water obtained from such distillation is stored for use in hydrating and washing subsequent batches of liquor.

The wash water containing alcohols, acid and olefins is distilled to recover the alcohol contained therein, and the olefin fraction passing off in the distillate may be collected and returned to a subsequent absorption step. The water recovered from such distillation is collected for use in subsequent hydrating and washing operations, together with water collected from other distillations as described above.

Secondary alcohol process

The olefin remaining after the performance of the series of absorption steps consists almost entirely of normal olefin and this hydrocarbon is next subjected to treatment to separately convert it into alcohols. In this treatment, the olefins are first absorbed in acid of much higher concentration than that used in the absorpton of the iso-olefins. Such higher concentration of acid is necessary to effect the absorption of the normal olefins, which are much less reactive than are the iso-olefins. The absorption of the normal olefins is performed in much the same manner as that of the iso-olefins and may be conducted in a series of steps if desired, although such treatment is not absolutely necessary. The mixture is cooled during the absorption step in the same manner as in the case of the iso-olefins. The entire batch of acid liquor is treated with water in order to obtain the hydration of this fraction. This batch is subjected to a settling operation to remove the major portion of the acid layer. The oil layer which includes the alcohols formed may be washed with water and distilled to yield a relatively pure mixture of secondary alcohols. The olefin isolated during the fractionation may be used in subsequent absorption steps in the same manner as described above in connection with isolated iso-olefin used in the manufacture of tertiary alcohols. Similarly, the water used in the hydration and washing steps is preferably alcoholic water containing secondary alcohols formed in the reaction, these two aspects of the invention being analogous to the relatively pure iso-olefin absorption, hydration and washing features of the tertiary alcohol process.

The following illustrative procedure may be used in the practice of the invention in the formation of secondary and tertiary amyl alcohols, this procedure illustrating the application of the process to an olefin mixture which contains about equal parts of normal and iso-amylenes containing a small proportion of mixed pentanes. 800 gallons of fresh sulphuric acid of 61–62% concentration are first placed in a mixer and 1200–1300 gallons of mixed amylenes from which part of the iso-amylenes have been stripped by a previous absorption step are gradually fed to the mixer, the contents being agitated and cooled by external water circulation during the feed to maintain the temperature below 30 degrees C. The agitation is maintained during the feed of olefin and for a period of sixty minutes after the termination of the feed. The contents of the mixer are then pumped to a settling tank. The amylene which separates from the acid layer upon settling is fed to a storage tank, from which it is later used in the secondary alcohol process.

Separated acid liquor from the settling tank is next returned to the mixer and 800 gallons of fresh amylene from storage, containing approximately equal amounts of normal and iso-amylene are gradually fed to the acid liquor therein, agitation and cooling conditions being maintained in the same manner as in connection with the preceding feed. The agitation is conducted for seventy-five minutes after the completion of the feed and the mixture is again settled and the unabsorbed amylene layer is stored for use in connection with the first absorption step involving a subsequent batch of fresh acid.

The acid liquor from the second absorption step is next returned to the mixed and a third feed of 1000 gallons of amylene having a very high proportion of iso-amylene is fed thereto to complete the third absorption step. This amylene may be obtained from any desired source, but it preferably comprises amylene formed as a by-product in the practice of the invention in connection with subsequent steps. 800 gallons of fresh mixed amylenes may be substituted for the amylene of high iso-content when an insufficient quantity of the high iso-content material is available. After the completion of this absorption step, the resulting mixture is again settled, the unabsorbed amylene being stored for use in a subsequent absorption step by another batch of acid.

1000 gallons of water are now fed into the mixer, this water containing tertiary amyl alcohol. The acid liquor is now gradually fed into the water in the mixer to effect the hydration reaction, agitation and cooling being maintained in order to keep the temperature below 30 degrees C. The diluted mixture contains alcohol and dilute acid as well as a certain amounting of contaminating hydrocarbon. It is subjected to a settling operation and the alcohol layer is returned to the mixer where it is subjected to repeated water washing operations with water containing tertiary amyl alcohol formed in the practice of the process with respect to previous batches. After the last water wash, the crude alcohol is dropped into a still containing a soda ash solution. The mixture is thoroughly agitated in order to completely neutralize all of the acid which is present. The neutralized oil is then subjected to fractional distillation with sparger steam, the fraction boiling below 50 degrees C. beng separately collected and stored. This fraction comprises almost pure iso-amylene and is used in the last absorption step in treatment of subsequent batches of acid. The fraction boiling above 50 degrees C. contains tertiary amyl alcohol contaminated with water, and this fraction is allowed to settle, the settling operation producing an alcohol layer containing a small proportion of water and a water layer containing a small proportion of alcohol. The water layer is removed from the alcohol layer by decantation and continuously returned to the still. The alcohol layer may be again distilled to produce comparatively pure tertiary amyl alcohol, the water collected incident to such distillation being used in subsequent hydrating and washing operations. The acid layer separated from the crude alcohol after the hydration operation is fed to a still. Upon the application of heat to this material, practically all of the alcohol which is present is decomposed to form amylene and water, the amylene, containing a small amount of alcohol, passing off and being collected and stored for use in the third absorption operation in the same manner as the amylene collected from the distillation of the crude alcohol.

In the manufacture of secondary alcohols from the normal amylene which has been stripped of substantially all of its iso content by the treatment described above, 1500 gallons of the stripped amylene mixture from the primary absorption operations are gradually fed to a mixer containing 700 gallons of 77% sulphuric acid, the mixture being agitated and maintained at a temperature below 30 degrees C. during the feed and for a period of approximately two hours after the completion thereof. The contents of the mixer are thereafter temporarily removed and 800 gallons of water are fed thereto. The acid liquor is then returned to the mixer and additional water is added, if necessary, to reduce the separated acid specific gravity to approximately 1.300 in order to facilitate settling of the mixture. The mixture is allowed to settle for about thirty minutes and the major portion of the acid layer is removed. The crude alcohol is then washed twice with water and is passed to a still into which 600 gallons of water have been previously run. The acid layer is also distilled in order to recover its alcohol content. The mixture is then wet distilled, the fraction boiling below 50 degrees C. being collected and passed to containers from which it is fed to subsequent batches of acid. The crude secondary alcohol may be further distilled in the same manner as described above in connection with the crude tertiary alcohol, and the alcohol contaminated water decanted off during such distillation may be used in subsequent hydrating and water-washing steps in the same manner as described in connection with the tertiary process.

The alcohols produced in the secondary and tertiary portions of the process may be separately fractionated and portions of one mixture may be blended with portions of another, as desired.

While the invention has been described with particular reference to an olefin mixture preponderating in amylenes, it will be understood that the general principles thereof are applicable to mixtures of other olefin isomers and that certain features of the invention are also applicable to mixtures containing non-isomeric olefins.

We claim:

1. The method of producing alcohol from a mixture consisting of a mixture of preponderating in isomeric olefin compounds which comprises subjecting said mixture to an absorption treatment with a mineral polybasic acid of a concentration adapted to selectively absorb the more reactive isomers of said mixture to the exclusion of the less reactive isomers thereof, removing the acid liquor so formed from the unabsorbed less reactive isomeric olefins, contacting the acid liquor with olefin material containing a higher proportion of said more reactive isomeric olefins than that contained in the principal body of mixture under treatment and hydrating said acid liquor after the last-named absorption treatment.

2. The method of producing alcohol from a mixture containing a number of isomeric amylene compounds which comprises subjecting said mixture to an absorption treatment with a mineral polybasic acid of a concentration adapted to selectively absorb iso-amylene of said mixture to the exclusion of normal amylene thereof, removing the acid liquor so formed from the unabsorbed normal amylene, contacting the acid liquor with olefin material containing a higher proportion of iso-amylene than that contained in the principal body of the mixture under treatment and hydrating said acid liquor after the last-named absorption treatment.

3. The method of producing alcohol from a mixture containing a number of isomeric amylene compounds which comprises subjecting said mixture to an absorption treatment with a mineral polybasic acid of a concentration adapted to selectively absorb iso-amylene of said mixture to the exclusion of normal amylene thereof, removing the acid liquor so formed from the unabsorbed normal amylene, contacting the acid liquor with substantially pure iso-amylene and hydrating said acid liquor after the last-named absorption treatment.

4. The method of forming alcohols from olefins which comprises absorbing olefin material in a mineral polybasic acid, hydrating the absorbed material, neutralizing the hydrated mixture, distilling the neutralized mixture to recover its alcohol content, and returning water passing off in such distillation operation continuously to the still, the return of water to the still being maintained at a rate sufficient to maintain a substantial volume of water in the still and thereby avoid extensive decomposition of alcohols in the distillation operation.

5. A process of producing alcohols from a mixture of olefins that comprises extracting the more reactive of the olefins from the mixture with a polybasic mineral acid, extracting a material containing a relatively high proportion of said more reactive olefin with the same acid, hydrating the extracted olefin, effecting a substantial separation of the alcohol so formed from the acid, recovering as unhydrated olefin the olefin remaining in the acid, washing the alcohol with water containing a small percentage of alcohol, distilling the alcohol, recovering during the distillation a quantity of water containing a small amount of alcohol, and utilizing the recovered olefin as a material containing a relatively high proportion of the reactive olefin and the recovered alcohol containing water as a wash-water in the subsequent performance of the process.

6. A process of producing alcohols from a mixture of olefins that comprises extracting the more reactive of the olefins from the mixture with a polybasic mineral acid, extracting a material containing a relatively high proportion of said more reactive olefin with the same acid, hydrating the extracted olefin, effecting a substantial separation of the hydrated olefin from the acid, recovering as unhydrated olefin the olefin remaining in the acid and utilizing the recovered olefin as a material containing a relatively high proportion of more reactive olefin in the subsequent operation of the process.

7. A process of producing alcohols from a mixture of olefins that comprises extracting the more reactive of the olefins from the mixture with a polybasic mineral acid, extracting a material containing a relatively high proportion of said more reactive olefin with the same acid, hydrating the extracted olefin, effecting a substantial separation of the hydrated olefin from the acid, distilling the alcohol so formed, recovering therefrom in the process of distillation a quantity of unhydrated olefin and utilizing the recovered olefin as a material containing a relatively high proportion of the reactive olefin in the subsequent performance of the process.

8. A process of producing alcohols from a mixture of olefins that comprises extracting the more reactive of the olefins from the mixture with a polybasic mineral acid, extracting a material containing a relatively high proportion of said more reactive olefin with the same acid, hydrating the extracted olefin, effecting a substantial separation of the hydrated olefin from the acid, distilling the alcohol so formed, recovering therefrom in the process of distillation a quantity of unhydrated olefin, recovering as unhydrated olefin the olefin remaining in the acid, and utilizing the olefin recovered from both sources as a material containing a relatively high proportion of the reactive olefin in the subsequent performance of the process.

9. A process of producing alcohols from olefins that comprises absorbing the olefin in a polybasic mineral acid, hydrating the absorbed olefin, separating the acid from the alcohol so formed, washing the alcohol, distiling the alcohol, recovering during the distillation a quantity of water containing a small amount of alcohol and using this water in the subsequent performance of the process as wash-water for the alcohol, thereby preventing a loss of alcohol in that step of the process.

10. A process of producing alcohols from olefins that comprises absorbing the olefin in a mineral polybasic acid, hydrating the obsorbed olefin, separating the acid from the alcohol so formed, washing the alcohol, distilling the alcohol, recovering during the distillation a mixture of alcohol and water, allowing the mixture to separate by gravity into a portion containing a preponderance of alcohol and some water, and a portion containing a preponderance of water and some alcohol, returning the alcoholic portion to the still and using the watery portion in the subsequent performance of the process as wash-water for the alcohol, thereby preventing a loss of alcohol in that step of the process.

LEE H. CLARK.
FRANK J. WORSTER.